US011151323B2

(12) United States Patent
Dechu et al.

(10) Patent No.: US 11,151,323 B2
(45) Date of Patent: Oct. 19, 2021

(54) EMBEDDING NATURAL LANGUAGE CONTEXT IN STRUCTURED DOCUMENTS USING DOCUMENT ANATOMY

(71) Applicant: International Business Machines Corporation, Armonk, NY (US)

(72) Inventors: Sampath Dechu, Bangalore (IN); Saravanan Krishnan, Bangalore (IN); Neelamadhav Gantayat, Bangalore (IN); Senthil Kumar Kumarasamy Mani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 16/207,983

(22) Filed: Dec. 3, 2018

(65) Prior Publication Data

US 2020/0175114 A1 Jun. 4, 2020

(51) Int. Cl.
*G06F 40/30* (2020.01)
*G06F 16/36* (2019.01)
(Continued)

(52) U.S. Cl.
CPC ............ *G06F 40/30* (2020.01); *G06F 16/367* (2019.01); *G06F 40/211* (2020.01); *G06K 9/00469* (2013.01)

(58) Field of Classification Search
CPC ...... G06F 40/30; G06F 16/367; G06F 40/211; G06K 9/00469
(Continued)

(56) References Cited

U.S. PATENT DOCUMENTS

| 7,509,572 B1 * | 3/2009 | Melander ............... G06F 40/35 715/234 |
| 7,958,444 B2 * | 6/2011 | Jacquin .................. G06F 40/20 715/232 |

(Continued)

OTHER PUBLICATIONS

Narayan et al., "Nerual Extractive Summarization with Side Information," arXiv preprint arXiv:1704.04530, 2017. 9 pages.

*Primary Examiner* — Pierre Louis Desir
*Assistant Examiner* — Nicole A K Schmieder
(74) *Attorney, Agent, or Firm* — Ryan, Mason & Lewis, LLP

(57) ABSTRACT

Methods, systems and computer program products for natural language context embedding are provided herein. A computer-implemented method includes extracting a document anatomy and document elements from a given structured document, identifying semantic references in the given structured document, and generating an ontology comprising (i) a hierarchy of concepts and (ii) relations connecting the concepts, each concept comprising attributes for a document element. The computer-implemented method also includes generating natural language text context for a given document element by utilizing the ontology to combine (i) attributes of a given concept corresponding to the given document element with (ii) attributes of another concept, the other concept corresponding to another document element, the other concept being connected to the given concept by at least one relation. The computer-implemented method further includes modifying the given structured document by embedding the natural language context with the given document element in the given structured document.

13 Claims, 11 Drawing Sheets

(51) Int. Cl.
*G06K 9/00* (2006.01)
*G06F 40/211* (2020.01)

(58) Field of Classification Search
USPC .............................................................. 704/9
See application file for complete search history.

(56) References Cited

U.S. PATENT DOCUMENTS

| 8,370,278 | B2* | 2/2013 | Vadlamani | G06N 5/04 |
| | | | | 706/12 |
| 10,019,525 | B1* | 7/2018 | Boni | G06F 16/90332 |
| 2005/0268219 | A1 | 12/2005 | Dalfo | |
| 2006/0247914 | A1 | 11/2006 | Brener et al. | |
| 2008/0097990 | A1 | 4/2008 | Mustafa | |
| 2010/0049590 | A1* | 2/2010 | Anshul | G06Q 30/02 |
| | | | | 705/7.32 |
| 2011/0131216 | A1 | 6/2011 | Chakravarthy et al. | |
| 2012/0192059 | A1 | 7/2012 | Laskaris et al. | |
| 2018/0089241 | A1 | 3/2018 | Mendels et al. | |
| 2018/0260389 | A1* | 9/2018 | Bahrami | G06F 40/221 |
| 2018/0336183 | A1* | 11/2018 | Lee | G06F 40/30 |
| 2019/0362020 | A1* | 11/2019 | Paulus | G06N 3/04 |

* cited by examiner

EMBEDDING NATURAL LANGUAGE CONTEXT IN STRUCTURED DOCUMENTS USING DOCUMENT ANATOMY

FIELD

The present invention relates to information technology, and, more particularly, to document processing.

BACKGROUND

Automated dialog systems, also referred to herein as conversation systems, are used in a wide variety of application areas. For example, automated dialog systems may be used to create various workspaces having different dialog flows for implementing chatbots for customer support, user interaction, etc. A chatbot is a computer program or other software which is capable of carrying out conversational communications via auditory and/or textual processes. Chatbots may be implemented as finite state machines. Such a system generally includes entities and dialog nodes, wherein each dialog node is a state in the finite state machine. Based on the user utterance received and the current dialog node, the system decides whether to move to a next and/or new dialog node.

SUMMARY

Embodiments of the invention provide techniques for automatically embedding natural language text context in structured documents. The natural language text context may be used to provide summarization of the structured documents or portions thereof, e.g., for use in an automated dialog system.

In one embodiment, an exemplary computer-implemented method comprises steps of extracting, from a given structured document, a document anatomy and a plurality of document elements, identifying a set of semantic references in the given structured document, utilizing the document anatomy and the plurality of document elements, generating, utilizing the identified set of semantic references, an ontology comprising (i) a hierarchy of concepts and (ii) relations connecting the concepts, each concept comprising one or more attributes for one of the plurality of document elements, generating natural language text context for a given one of the document elements by utilizing the ontology to combine (i) at least one attribute of a given one of the concepts corresponding to the given document element with (ii) at least one attribute of at least one other one of the concepts, the at least one other concept corresponding to at least one other one of the plurality of document elements, the at least one other concept being connected to the given concept by at least one of the relations, and modifying the given structured document by embedding the natural language context with the given document element in the given structured document. The steps are carried out by at least one computing device.

In another embodiment, an exemplary computer-implemented method comprises steps of receiving a set of structured documents, generating, utilizing both document anatomies and a plurality of document elements extracted from the set of structured documents, an ontology comprising (i) a hierarchy of concepts and (ii) relations connecting the concepts, each concept comprising one or more attributes for at least one of the plurality of document elements, generating natural language text context for at least a subset of the plurality of document elements, wherein generating the natural language text context comprises utilizing the ontology to combine (i) at least one attribute of a first one of the concepts corresponding to a first one of the plurality of document elements with (ii) at least one attribute of at least a second one of the concepts, the second concept corresponding to at least a second one of the plurality of document elements, the second concept being connected to the first concept by at least one of the relations, provisioning an automated dialog system utilizing the generated natural language text context, and utilizing the automated dialog system to provide summaries of at least a portion of the set of structured documents utilizing the generated natural language text context. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
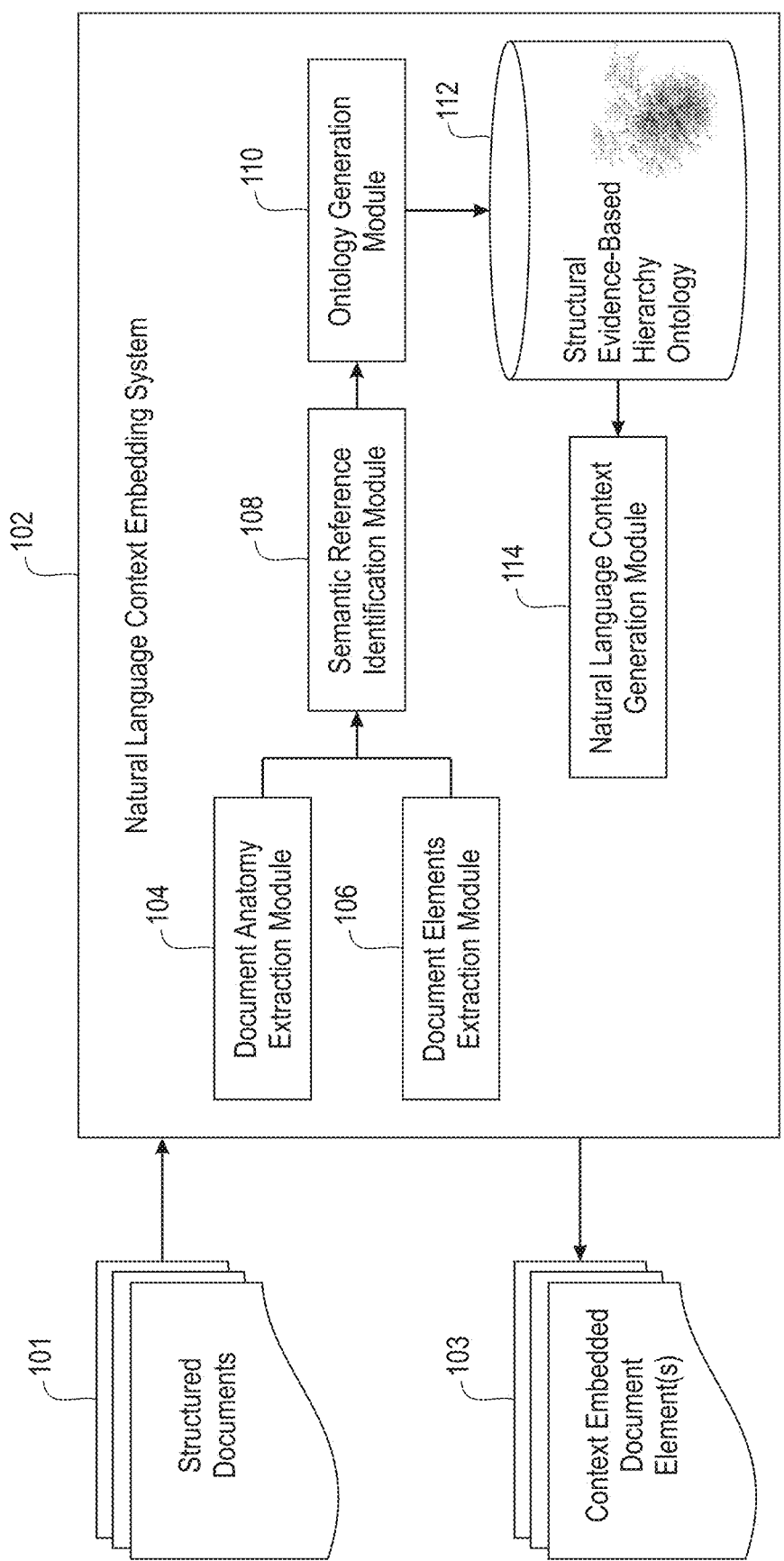
FIG. 1 depicts a natural language context embedding system, according to an exemplary embodiment of the present invention.

Illustrative embodiments of the invention may be described herein in the context of illustrative methods, systems and devices for embedding natural language context in elements of a document. However, it is to be understood that embodiments of the invention are not limited to the illustrative methods, systems and devices but instead are more broadly applicable to other suitable methods, systems and devices.

Various types of documents may be used to build various types of automated dialog systems, for customer support or other user interaction, employee training, intelligent tutoring, etc. Questions and answers that are generated from a set of documents (e.g., enterprise documents) can be used to enrich training data for question answering systems deployed in such application areas. Enterprise text data may be in the form of user guides, process help documents, application information documents, product help guides, etc. The enterprise text data may be in various document formats such as Portable Document Format (PDF), Hypertext Markup Language (HTML), eXtensible Markup Language (XML), e-book (e.g., .epub files), word processing documents (e.g., .doc/.docx documents), presentation documents (e.g., .ppt/.pptx documents), spreadsheets (e.g., .xls/.xlsx spreadsheets), etc. Such documents may be well-formatted, and are often written by experienced or professional document writers. To reduce the curation effort of question and answer systems (e.g., a chatbot or other automated dialog system), there is a need for automatically generating questions and answers from such documents.

Documents may be summarized using titles, image labels, etc. without considering the "anatomy" of the document (e.g., document elements thereof). Consider, as an example, the following portion of a structured document:

1.1 Operating System
1.2 Types
The following sections discuss types of operating systems:
1.2.1 Microsoft Windows
1.2.2 Linux Conventional summarization techniques would ignore the sentence "The following sections discuss types of operating systems:" and thus would not be able to convey that there are two types of operating systems (e.g., Microsoft Windows® and Linux®).

Text and external sources of information, such as user profiles and relational databases, may be used to generate natural language enriched sentences. For example, a system may take as input sentences of a document and various profiles (e.g., user profiles such as comprehensive, general, personal, professional, commercial, business, legal, medical, science, literature, etc.) to generate enhanced or enriched versions of such sentences. Different profiles may result in different enhanced sentences.

Context may also be generated in non-natural language form (e.g., as keywords, etc.) for applications such as searching. For example, sentences of a document may be enhanced or enriched by loading configuration information from a repository to add contextual information. A system may also receive as input a text document and structured data in the form of a relational database, where terms in the text document are identified and used to search or query the structured data in the relational database to identify fragments of the structured data relevant to the input text document.

Techniques are needed, however, for using document anatomy to generate context in natural language, which provides improved document summarization and facilitates the operation of automated dialog systems. Structured and formatted documents, in some embodiments, are assumed to have clearly defined document elements including but not limited to a table of contents, sections, subsections, figures with captions, tables with captions, bulleted lists with proper indentation, headers, footers, etc. Structured documents may have context or metadata information that is not necessarily present in the text of the document elements. Conventional approaches do not provide techniques for utilizing such context and metadata information from various parts of structured documents to generate questions and answers, or more generally natural language context, for the document elements.

Illustrative embodiments address the need for generating natural language context for document elements in structured documents. The natural language context, which may be in the form of questions and answers for use in an automated dialog system, is embedded in the document elements of the structured documents. Systems for natural language context embedding in some embodiments generate natural language questions from structured documents, using the context of document elements from other parts of the structured documents. Generally, a natural language context embedding system as described herein takes as input structured documents, and provides as output document elements that are embedded with context (e.g., in the form of questions and answers). To do so, some embodiments utilize semantic annotation of structural elements in a structured document using descriptive sentences in the document. Context embedding in the document elements may use the semantic annotations for answer unit creation. Context driven question generation for the document elements may follow from or utilize the semantic annotations and created answer units.

Illustrative embodiments utilize document anatomy and semantic references to enrich structured documents with natural language context. Such natural language context may be used for summarization, for building a finite state machine for a chatbot or other automated dialog system, etc.

FIG. 1 shows a natural language context embedding system 102, which takes as input structured documents 101 and provides as output context embedded document elements 103. The natural language context embedding system 102 utilizes document anatomy and semantic references to enrich the structured documents 101 with natural language context for summarization or other purposes, as will be described in further detail below. Illustrative embodiments advantageously refer to or utilize information that is present in the structure of a document but not available in natural language form to generate natural language sentences that are embedded or otherwise associated with document elements in the structured documents 101 to provide context embedded document elements 103.

The natural language context embedding system 102 includes a document anatomy extraction module 104, a document elements extraction module 106, a semantic reference identification module 108, an ontology generation module 110, a structural evidence-based hierarchy ontology 112, and a natural language context generation module 114. The document anatomy extraction module 104, document elements extraction module 106 and semantic reference identification module 108 are used to extract, identify or otherwise obtain document anatomy, document elements, and semantic references from the structured documents 101. The ontology generation module 110 builds the structural evidence-based hierarchy ontology 112 to represent relationships between the document elements using the document anatomy and semantic references or other attributes of the structured documents 101. Using the ontology of relationships and associated semantic references (e.g., the structural evidence-based hierarchy ontology 112), the natural language context generation module 114 generates context in natural language form that is embedded into the document elements to provide context embedded document elements 103. The functionality of the modules 104, 106, 108, 110 and 114 will be described in further detail below with respect to FIGS. 2-6.

Figure 2:
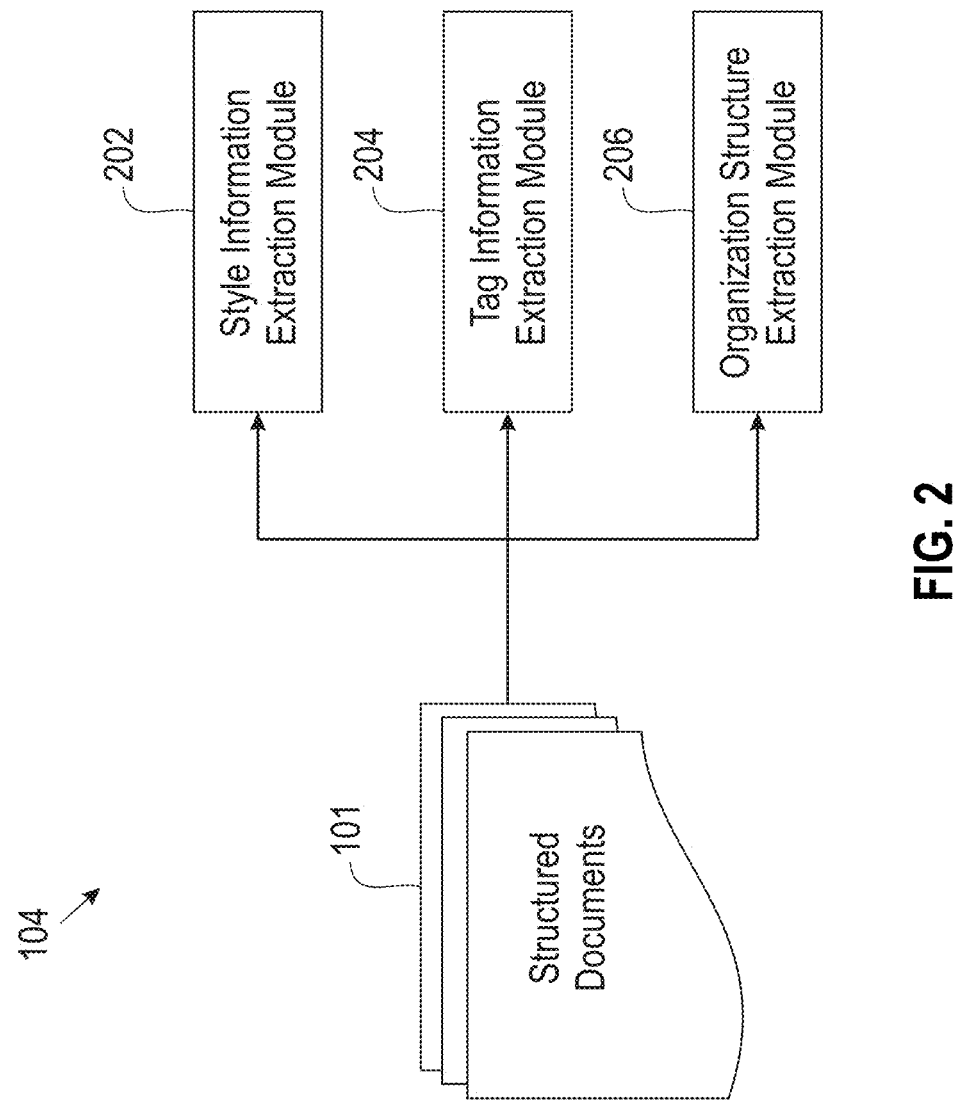
FIG. 2 depicts document anatomy extraction in the FIG. 1 natural language context embedding system, according to an exemplary embodiment of the present invention.

FIG. 2 illustrates operation of the document anatomy extraction module 104. Document anatomy of the structured documents 101 may be extracted using style information extraction module 202, tag information extraction module 204 and organization structure extraction module 206. As noted above, structured documents 101 are assumed to include clearly defined document elements including, but not limited to, a table of contents, sections, subsections, figures with captions, tables with captions, bulleted lists with proper indentation, headers, footers, footnotes, endnotes, references, etc. The modules 202, 204 and 206 may utilize document elements such as a table of contents (if available) along with section and subsection information to extract hierarchical relationships between different textual chunks of the structured documents 101, along with anchor and reference sentences. Other types of document elements, such as footnotes and references, may provide additional information pertaining to a particular statement, sentence or other portion of one or more of the structured documents 101. Reference or anchor sentences may also be extracted using document elements, such as bullets and numbered lists, captions for images, figures, and tables, etc. Various other document elements may be used to extract document anatomy in other embodiments.

It should be appreciated that the particular module or modules 202/204/206 used for extracting document anatomy may vary based on the type or format of the structured documents 101. For example, if a given one of the structured documents 101 comprises a word processing document, the style information extraction module 202 may use header style information (e.g., Header 1, Header 2, Header 3, etc.) to extract document anatomy. If a given one of the structured documents 101 comprises an XML or HTML document, the tag information extraction module 204 can identify document anatomy based on the tags in the XML or HTML document. If a given one of the structured documents 101 comprises an epub document, the organization structure extraction module 206 may utilize hyperlinks to identify relations or other document anatomy.

Figure 3:
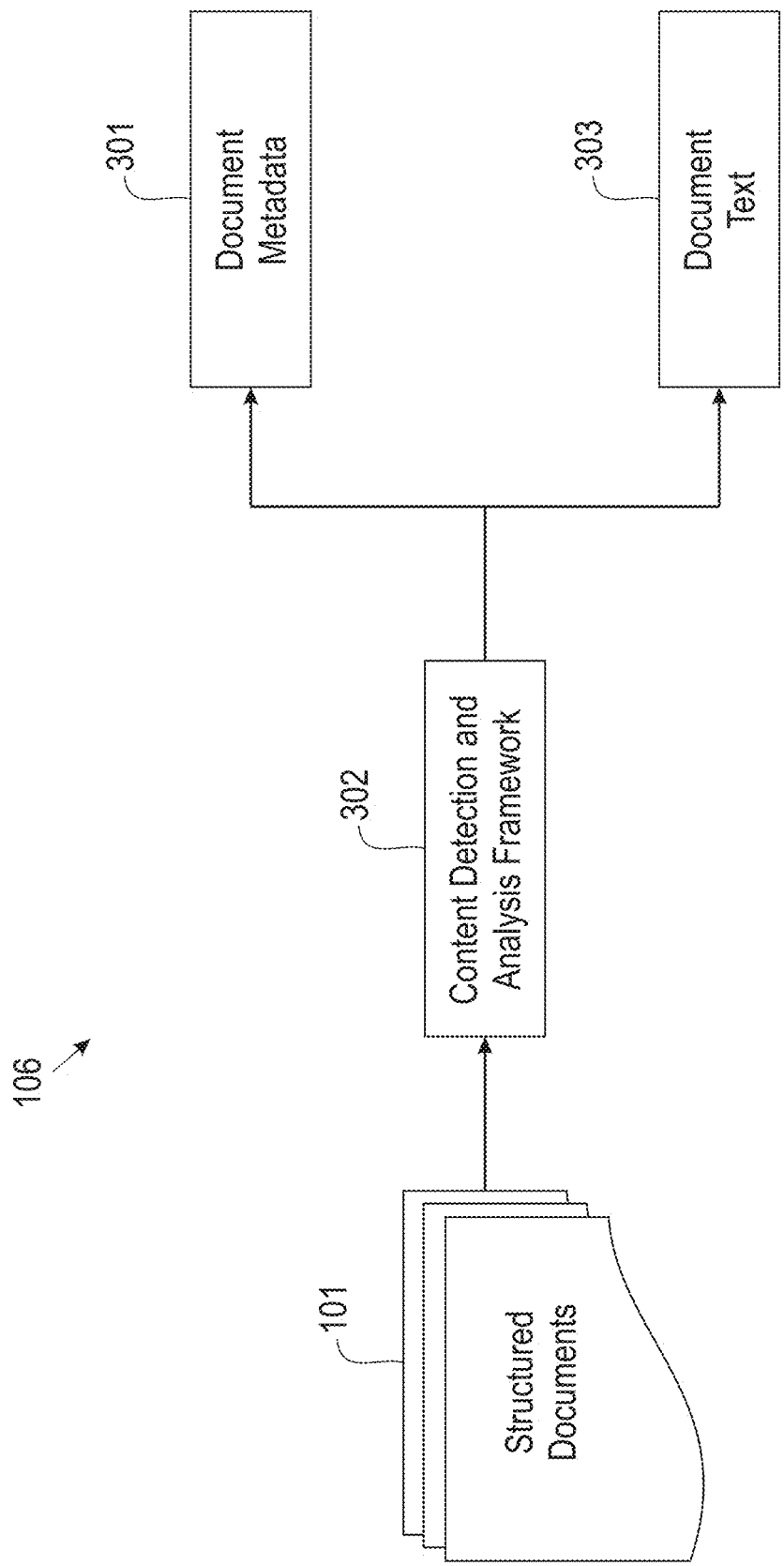
FIG. 3 depicts document element extraction in the FIG. 1 natural language context embedding system, according to an exemplary embodiment of the present invention.

FIG. 3 illustrates operation of the document elements extraction module 106. A content detection and analysis framework 302 may be utilized to extract document metadata 301 and document text 303 from the structured documents. The content detection and analysis framework 302 parses the structured documents 101 to identify structural elements such as paragraph text, tables, figures, bulleted or numbered lists, headers, footers, endnotes, footnotes and various other types of document elements. In some embodiments, document parsing tools such as pdf2html or Apache Tika™ may be used by the content detection and analysis framework 302 to parse the structured documents 101.

Figure 4:
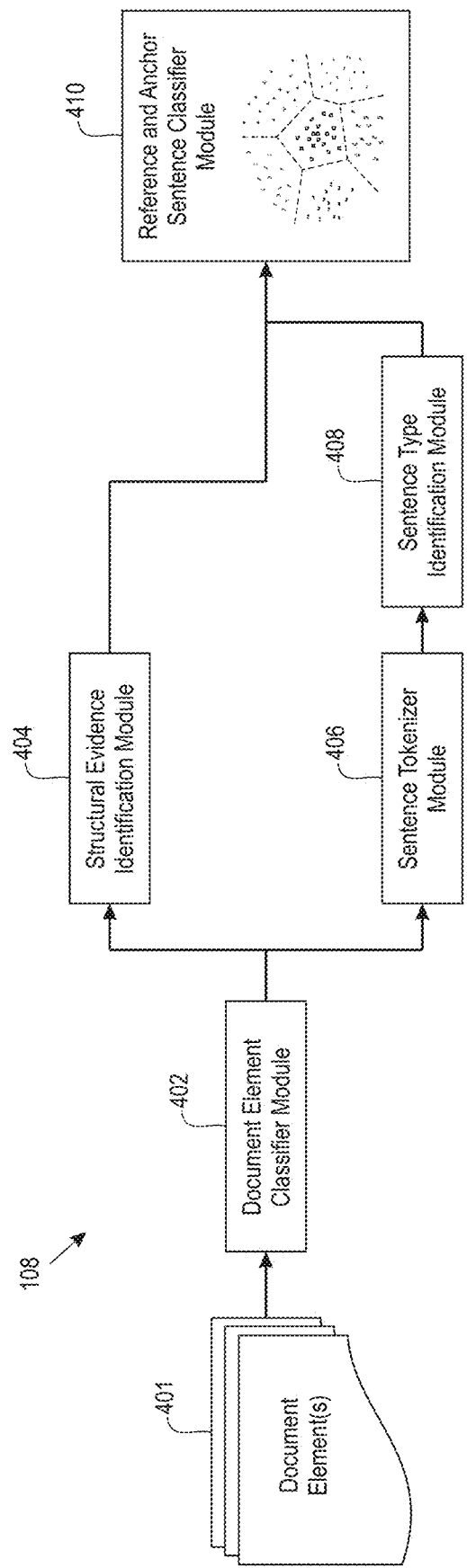
FIG. 4 depicts semantic reference identification in the FIG. 1 natural language context embedding system, according to an exemplary embodiment of the present invention.

FIG. 4 illustrates operation of the semantic reference identification module 108. The semantic reference identification module 108 utilizes (i) the document anatomy extracted by module 104 and (ii) document elements 401 extracted by the module 106 to identify semantic references in the structured documents 101. The document element classifier module 402 identifies the type (e.g., text, image, table, bulleted list, etc.) of each of the document elements 401. Based on the type of document element, structural evidence and/or semantic clues are used to get semantic references. The structural evidence identification module 404 can use the structure of a given one of the document elements 401, along with its associated document element type, to get semantic references. For example, in the case of a given document element that is a bulleted or numbered list, a line or sentence immediately preceding the bulleted or numbered list may be identified as a reference or anchor sentence. In the case of a given document element that is text, the first line may be identified as a reference or anchor sentence. Reference or anchor sentences for other types of document elements may similarly by identified by the structural evidence identification module 404.

The sentence tokenizer module 406 is configured to take a given document element and separate it into sentences. The sentence type identification module 408 can utilize natural language processing (NLP) techniques to identify the type (e.g., copula, declarative, factual, etc.) for each of the sentences tokenized by the sentence tokenizer module 406.

The reference and anchor sentence classifier module 410 passes structural evidence from the structural evidence identification module 404 and semantic clues (e.g., sentence types) from the sentence type identification module 408 through a text classifier to identify whether particular sentences should in fact be classified as anchor or reference sentences.

There may be semantic references (e.g., reference and anchor sentences) throughout the structured documents. For example, a sentence such as "Section <X> explains the experiments conducted . . . " may be a reference sentence for a textual chunk, the sentence "Figure <X> explains the architecture . . . " may be a reference sentence for an image element, the sentence "Table <X> lists the growth . . . " may be a reference sentence for a table element. It should be appreciated that these sentences are provided by way of example only for a few of the possible document element types, and that other types of sentences may be reference sentences for these and other document element types. For example, references and footnote document elements provide other kinds of semantic references in structured documents 101. Anchor sentences may include sentences such as "The following are the advantages . . . ," and "This section talks about . . . ," etc. Again, these are just examples of anchor sentences, and a text classifier used by the reference and anchor sentence classifier module 410 may be trained to identify various desired types of reference and anchor sentences for a particular use case scenario.

Figure 5:
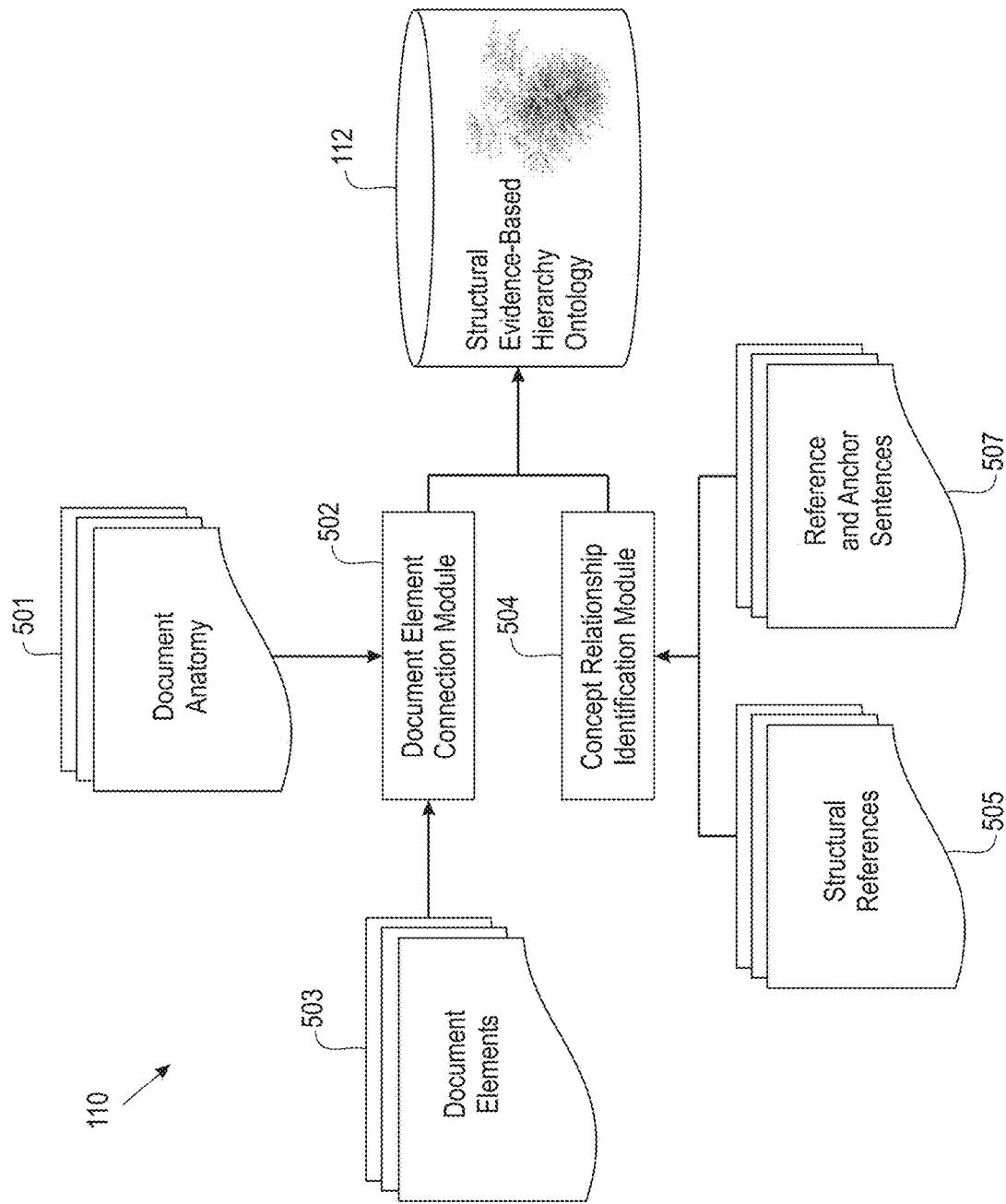
FIG. 5 depicts ontology generation in the FIG. 1 natural language context embedding system, according to an exemplary embodiment of the present invention.

FIG. 5 illustrates operation of the ontology generation module 110, which is configured to utilize various elements of the structured documents 101, including the document anatomy 501, document elements 503, structural references 505, and reference and anchor sentences 507 thereof, to build structural evidence-based hierarchy ontology 112, also referred to herein as ontology 112. The ontology 112 includes concepts and relations. Concepts in the ontology 112 refer to document elements 503 and their corresponding attributes. The document element connection module 502 is configured to utilize the document anatomy 501 and document elements 503 to generate concepts in the ontology 112. Based on the document anatomy 501, different ones of the document elements 503 may be connected to generate a concept in the ontology 112. For example, each chapter may be considered as a "tree" having sections and subsections as its intermediate nodes.

The concept relationship identification module 504 is configured to utilize structural references 505 and reference and anchor sentences 507 to generate relations in the ontology. Various relations, for example, may be identified based on referential sentences. If the body of a particular paragraph contains a figure, then the reference sentence for that figure (e.g., "Figure <X> explains the architecture diagram . . . ") may be used to generate or identify a relation in the ontology 112 (e.g., to establish a relation between the document element containing that paragraph and the document element containing the image of that figure).

Although not shown in FIG. 5, it should be appreciated that the document anatomy 501 and/or document elements 503 may be utilized by the concept relationship identification module 502 to generate relations in the ontology 112. Similarly, the structural references 505 and reference and anchor sentences 507 may be utilized by the document element connection module 502 to generate concepts in the ontology 112.

Attributes of document elements 503 may vary based on the type of document element. Consider, by way of example, the following document element value:

Two forms are supported: cost-based and account-based.

Cost-based: is a form of profitability analysis that groups costs and revenues according to value fields and cost-based valuation approaches, both of which may be user-defined.

Account-based: is a form profitability analysis organized in accounts and using an account-based valuation approach. The distinguishing characteristic of this form is its use of cost and revenue elements. It is also possible to use both of these types of CO-PA[1] simultaneously.

For this example, various attributes may be learned using semantic references contained therein. For example, a section name document element may have an attribute of "Profitability Analysis." Sub-section names for this section include types, features, etc. of profitability analysis (e.g., cost-based and account-based profitability analysis). This chunk of one of the structured documents also includes a footnote 1, which states "[1] Profitability analysis is also known as CO-PA." The anchor sentence "The following are types of profitability analysis" may also be extracted. If there are associated figures, referential sentences such as "Figure <X> is the architecture diagram . . . " or similar may be extracted.

Consider, as another example, the following hierarchy of section and sub-section names:

Operation System
   Types
      Windows
      Linux

Given these, relationships may be associated with the concept "Operating System." For example, Linux and Windows may have a "type" relationship to the concept of "Operating System" (e.g., Linux and Windows are types of operating systems).

Figure 6:
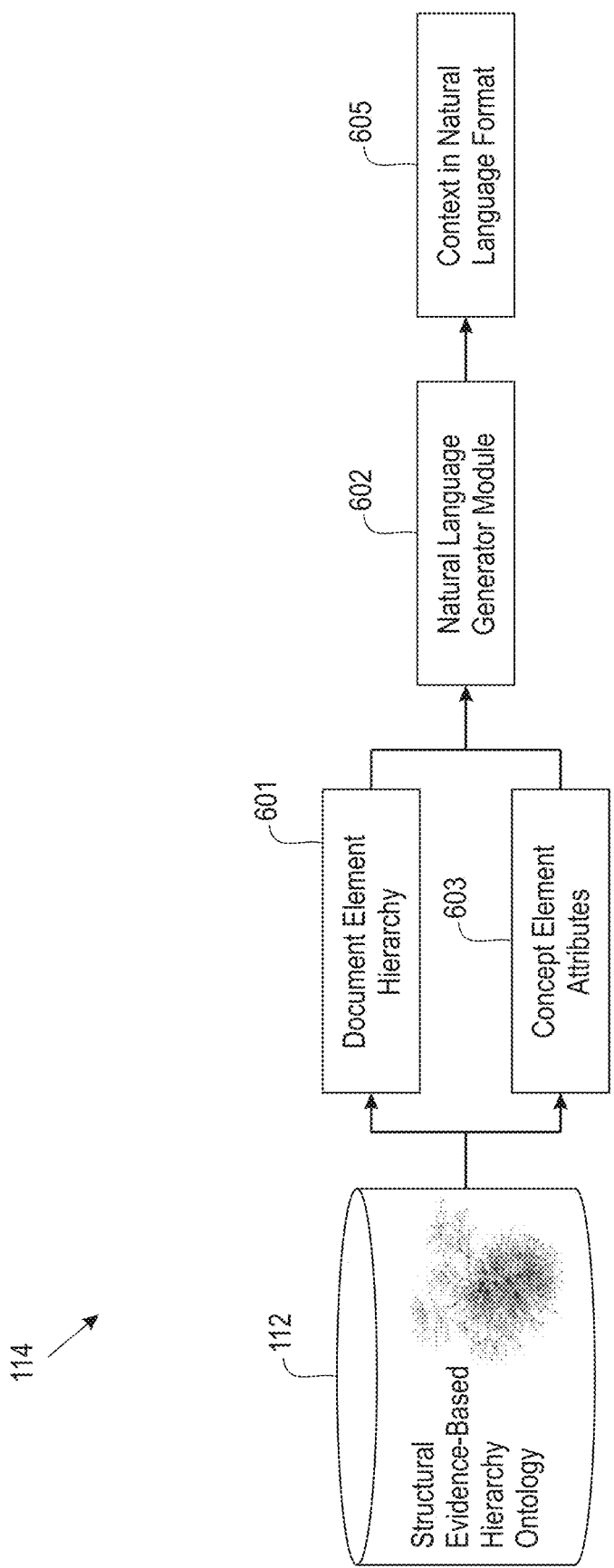
FIG. 6 depicts natural language context generation in the FIG. 1 natural language context embedding system, according to an exemplary embodiment of the present invention.

FIG. 6 illustrates operation of the natural language context generation module 114.

The natural language generator module 605 utilizes a document element hierarchy 601 and concept element attributes 603 from the ontology 112 to generate context in a natural language format 605. For example, given hierarchy 601 and attributes 603, the natural language generator module 602 may generate a natural language sentence. Continuing with the example above, the ontology 112 may have a concept containing section of "operating system types" that is connected with two sub-section concepts "Windows" and "Linux." The hierarchy 601 is section name followed by sub-section names. The attributes 603 of these three concepts include the section name of "operating system types" and sub-section names of "Windows" and "Linux." With this information, the natural language generator module 602 generates the following sentence: "Two types of operating systems are Windows and Linux."

Consider, by way of example, the following architecture of a structured document:

1 Types of operating systems
2 History
3 Examples of operating systems
  3.1 Unix and Unix-like operating systems
    3.1.1 BSD and its descendants
    3.1.2 Linux
  3.2 Microsoft Windows
4 Components
  4.1 Kernel
   . . .
    4.1.6 Multitasking
   . . . .

Given the above, various natural language contexts may be generated using section and sub-section names and the associated textual content (e.g., attributes) of such sections and sub-sections. For example, the sub-section 3.1.2 for Linux may contain the sentence "Linux is Unix-like, but was developed with . . . " which is used to generate the natural language context of "Linux is a Unix-based operating system." The sub-section 3.2 for Microsoft Windows may contain the sentence "Microsoft Windows is a family of proprietary operating systems . . . " which may be used to generate the natural language context of "Microsoft Windows is an operating system." Similarly, the sub-section 4.1 for Kernel may be used to generate the natural language context of "The kernel is a component of an operating system." The sub-section 4.1.6 for Multitasking may be used to generate the natural language context of "The kernel is a component of an operating system, and multitasking is one of its responsibilities."

Figure 7:
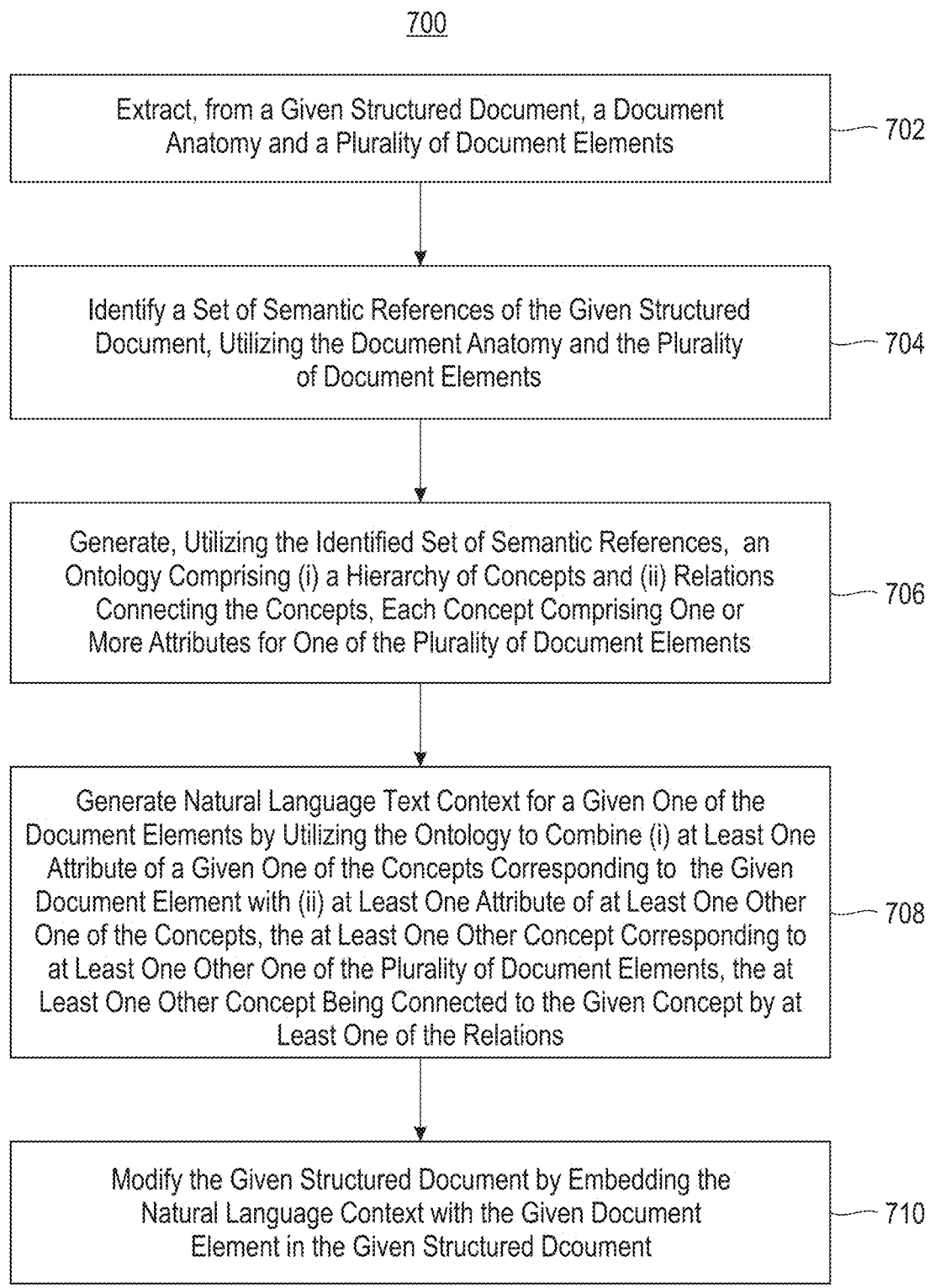
FIG. 7 depicts a process for embedding natural language context in elements of a document, according to an exemplary embodiment of the present invention.

FIG. 7 depicts a process flow 700 for automatically embedding natural language text context in structured documents. The process flow 700 begins with step 702, extracting, from a given structured document, a document anatomy and a plurality of document elements. Extracting the document anatomy in step 702 may include utilizing at least one of style information, tags information, and organization information of the given structured document. If the given structured document comprises a word processing document, extracting the document anatomy may comprise utilizing the style information to extract relations in the form of header styles from the word processing document. If the given structured document utilizes a given markup language, extracting the document anatomy may comprise utilizing the tag information to extract relations in the form of tags of the given markup language from the given structured document. If the given structured document comprises a format that utilizes one or more hyperlinks for organization information, extracting the document anatomy utilizing the organization information may comprise extracting relations in the form of the one or more hyperlinks. Extracting the plurality of document elements in step 702 may include parsing the given structured document to identify a set of structural elements. The set of structural elements may include paragraph text, tables, figures, numbered or bulleted lists, footnotes, references, etc.

The process flow 700 continues with step 704, identifying a set of semantic references of the given structured document utilizing the document anatomy and the plurality of document elements. Step 704 may include, for the given document element, determining a document element type of the given document element, identifying at least one of: structural evidence for the determined document element type; and semantic clues for one or more sentences in the given document element, and passing the structural evidence and the semantic clues through a text classifier to identify whether a given sentence of the given document element comprises a reference sentence or an anchor sentence. Identifying the structural evidence may comprise: selecting a first line of the given document element when the given document element comprises a paragraph text document element type, a footnote document element type, or a reference document element type; selecting a header or caption of the given document element when the given document element comprises a table document element type or a figure document element type; and selecting a line preceding the first line of the given document element when the given document element type comprises a numbered or bulleted list document element type. Identifying the semantic clues may comprise, for a given sentence in the given document element, using natural language processing to identify a type of the given sentence.

In step 706, the set of semantic references identified in step 704 are utilized to generate an ontology comprising a hierarchy of concepts and relations connecting the concepts, each concept comprising one or more attributes for one of the plurality of document elements. Step 706 may include connecting the given document element with one or more other ones of the plurality of document elements utilizing the document anatomy. Connecting the given document element with one or more other ones of the plurality of document elements may be based at least in part on one or more referential sentences in the given document element.

In step 708, natural language text context for a given one of the document elements is generated. Step 708 includes utilizing the ontology to combine at least one attribute of a given one of the concepts corresponding to the given document element with at least one attribute of at least one other one of the concepts. The at least one other concept corresponds to at least one other one of the plurality of document elements. The at least one other concept is connected to the given concept by at least one of the relations. In step 710, the given structured document is modified to embed the natural language text context in association with the given document element. The embedded natural language text context associated with the given document element may be used to provide a summary of at least a portion of the given structured document for use in an automated dialog system.

Figure 8:
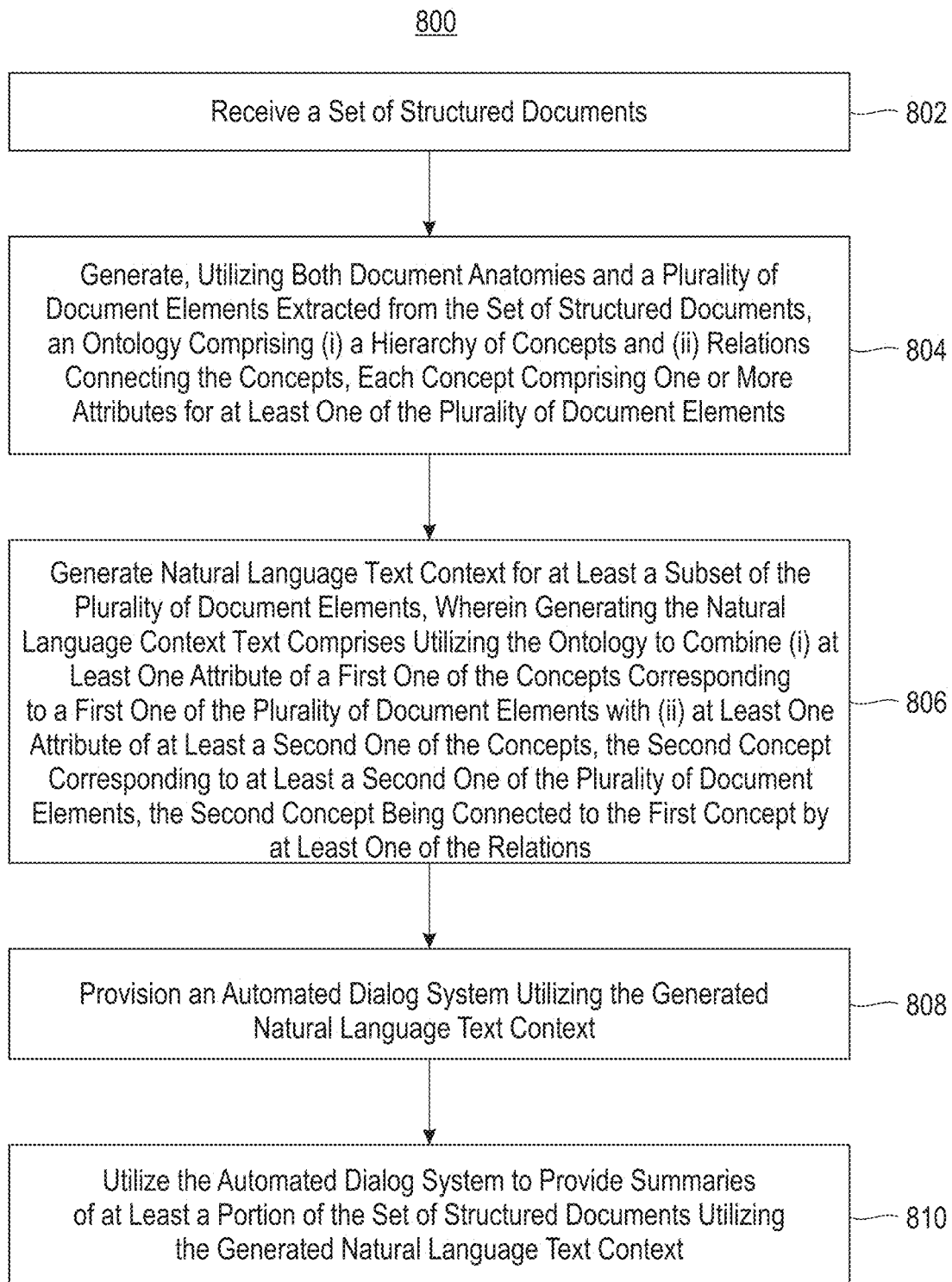
FIG. 8 depicts another process for embedding natural language context in elements of a document, according to an exemplary embodiment of the present invention.

FIG. 8 depicts a process flow 800 for automatically training or provisioning an automated dialog system with natural language text context for a set of structured documents. The process flow 800 begins with step 802, receiving a set of structured documents. In step 804, an ontology is generated utilizing document anatomies and a plurality of document elements extracted from the set of structured documents received in step 802. The ontology comprises a hierarchy of concepts and relations connecting the concepts, each concept comprising one or more attributes for at least one of the plurality of document elements. Generating the ontology in step 804 may include connecting the first document element with the second document element based at least in part on one or more referential or anchor sentences in the first document element. A set of semantic references of the first document element may be identified by determining a document element type of the first document element, identifying at least one of structural evidence for the determined document element type and semantic clues for one or more sentences in the first document element, and passing the structural evidence and the semantic clues through a text classifier to identify whether a given sentence of the first document element comprises a reference sentence or an anchor sentence.

In step 806, natural language text context is generated for at least a subset of the plurality of document elements. Step 806 includes utilizing the ontology to combine at least one attribute of a first one of the concepts corresponding to a first one of the plurality of document elements with at least one attribute of at least a second one of the concepts. The second concept corresponds to at least a second one of the plurality of document elements. The second concept is connected to the first concept by at least one of the relations. In step 808, an automated dialog system is provisioned utilizing the natural language text context generated in step 806. The automated dialog system is utilized in step 810 to provide summaries of at least a portion of the set of structured documents utilizing the generated natural language text context.

Illustrative embodiments provide a number of advantages relative to conventional techniques. For example, some embodiments look at structural components of documents to derive context (e.g., by deriving natural language context using document structural elements, relationships between such elements, and semantic references). Some embodiments further build an ontology that represents document structural relationships, and the relationships in the ontology are used to derive natural language context. Embodiments further extract the document anatomy, not just document elements, along with identifying semantic references of and between the document elements. Natural language context is used to enhance the content of structured documents, such as for use in summarizing the structured documents or portions thereof. The natural language context embedded in such structured documents may further be utilized to train or provision an automated dialog system to provide an interface for the user to leverage the natural language context for various tasks (e.g., querying, learning about a corpus including the structured documents, providing support, etc.).

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
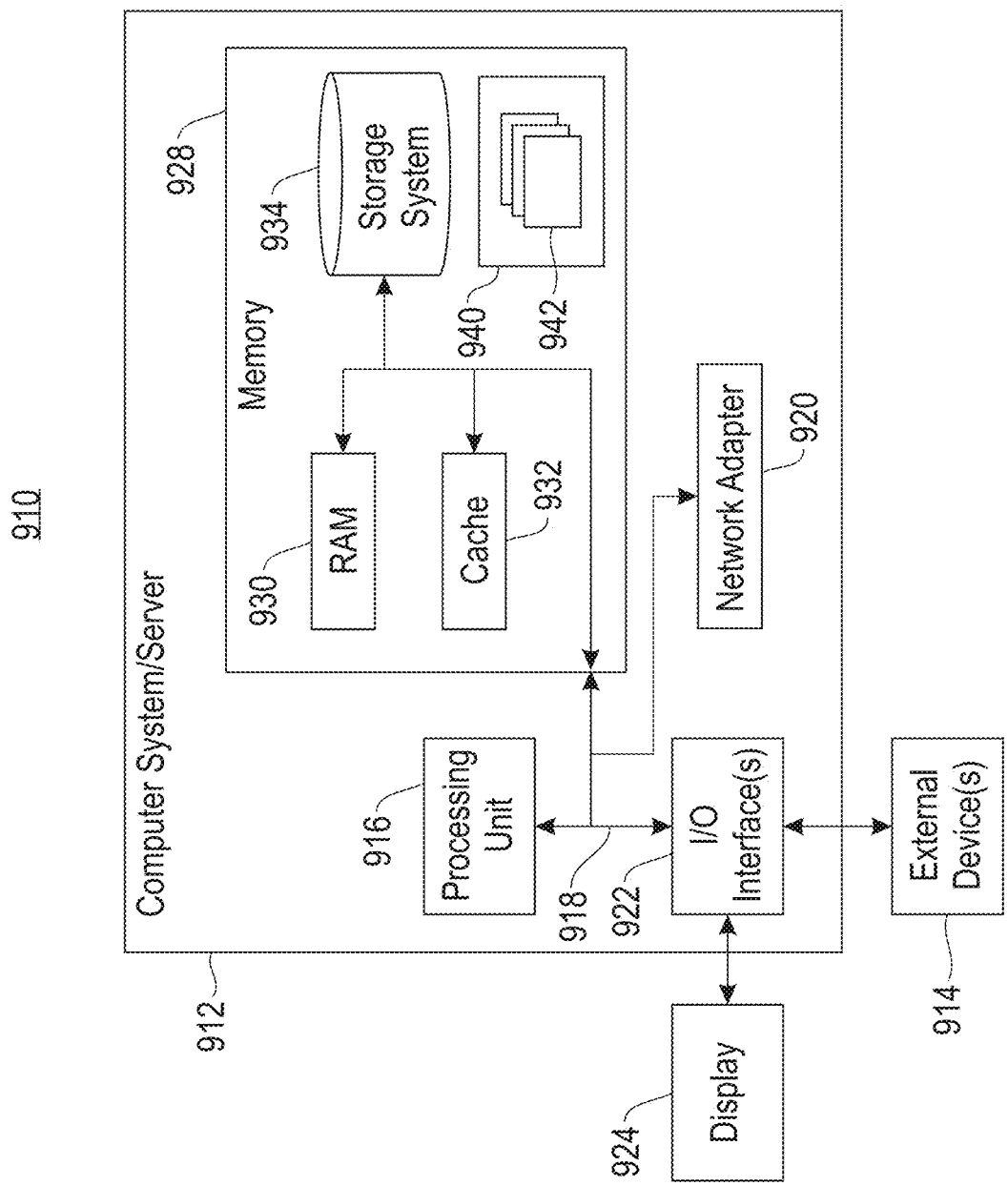
FIG. 9 depicts a computer system in accordance with which one or more components/steps of techniques of the invention may be implemented, according to an exemplary embodiment of the invention.

One or more embodiments can make use of software running on a general-purpose computer or workstation. With reference to FIG. 9, in a computing node 910 there is a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 912 in computing node 910 is shown in the form of a general-purpose computing device. The components of computer system/server 912 may include, but are not limited to, one or more processors or processing units 916, a system memory 928, and a bus 918 that couples various system components including system memory 928 to processor 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as random access memory (RAM) 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 918 by one or more data media interfaces. As depicted and described herein, the memory 928 may include at least one program product having a set (e.g., at least one) of program modules that are configured to carry out the functions of embodiments of the invention. A program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via I/O interfaces 922. Still yet, computer system/server 912 can communicate with one or more networks such as a LAN, a general WAN, and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
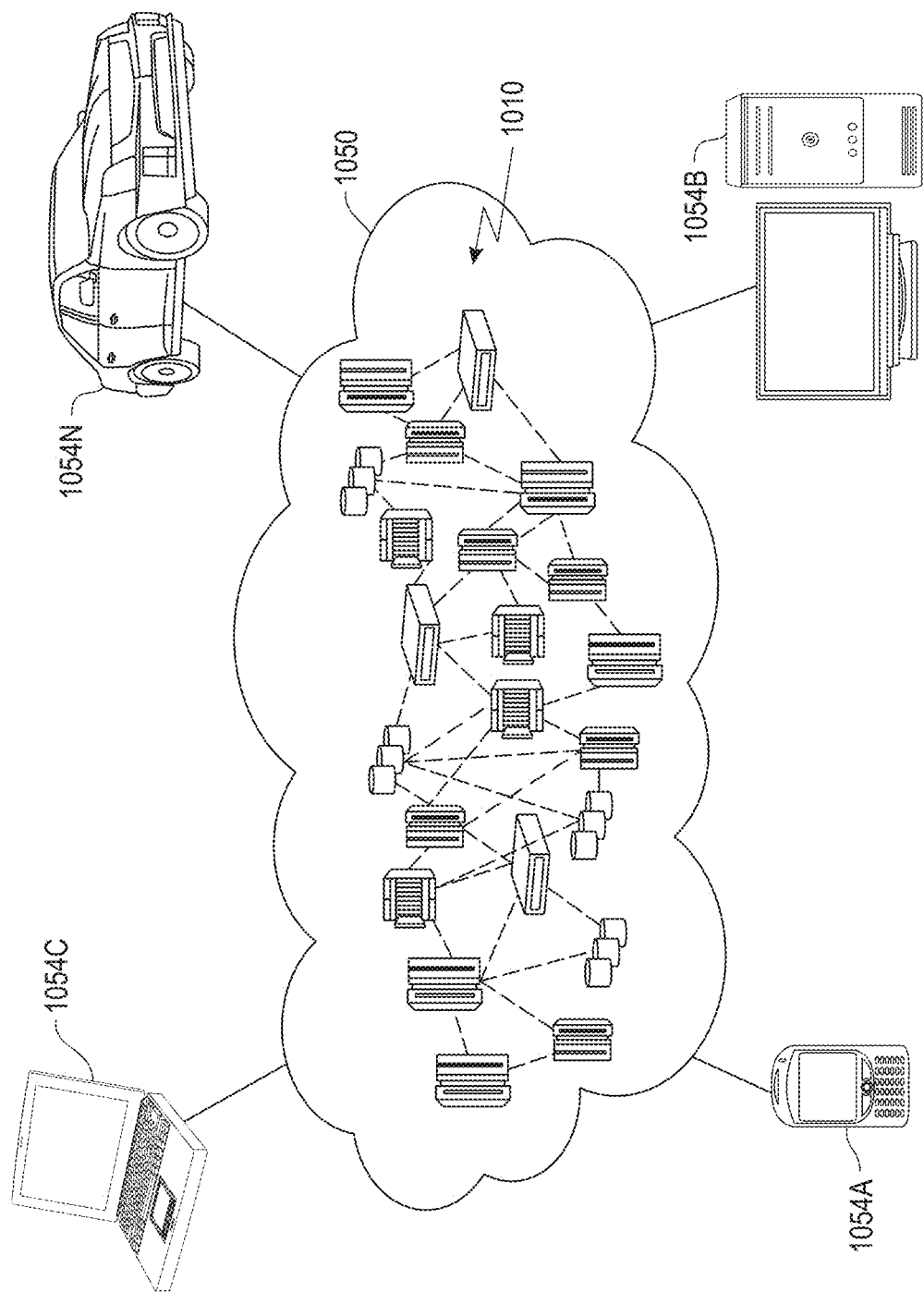
FIG. 10 depicts a cloud computing environment, according to an exemplary embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
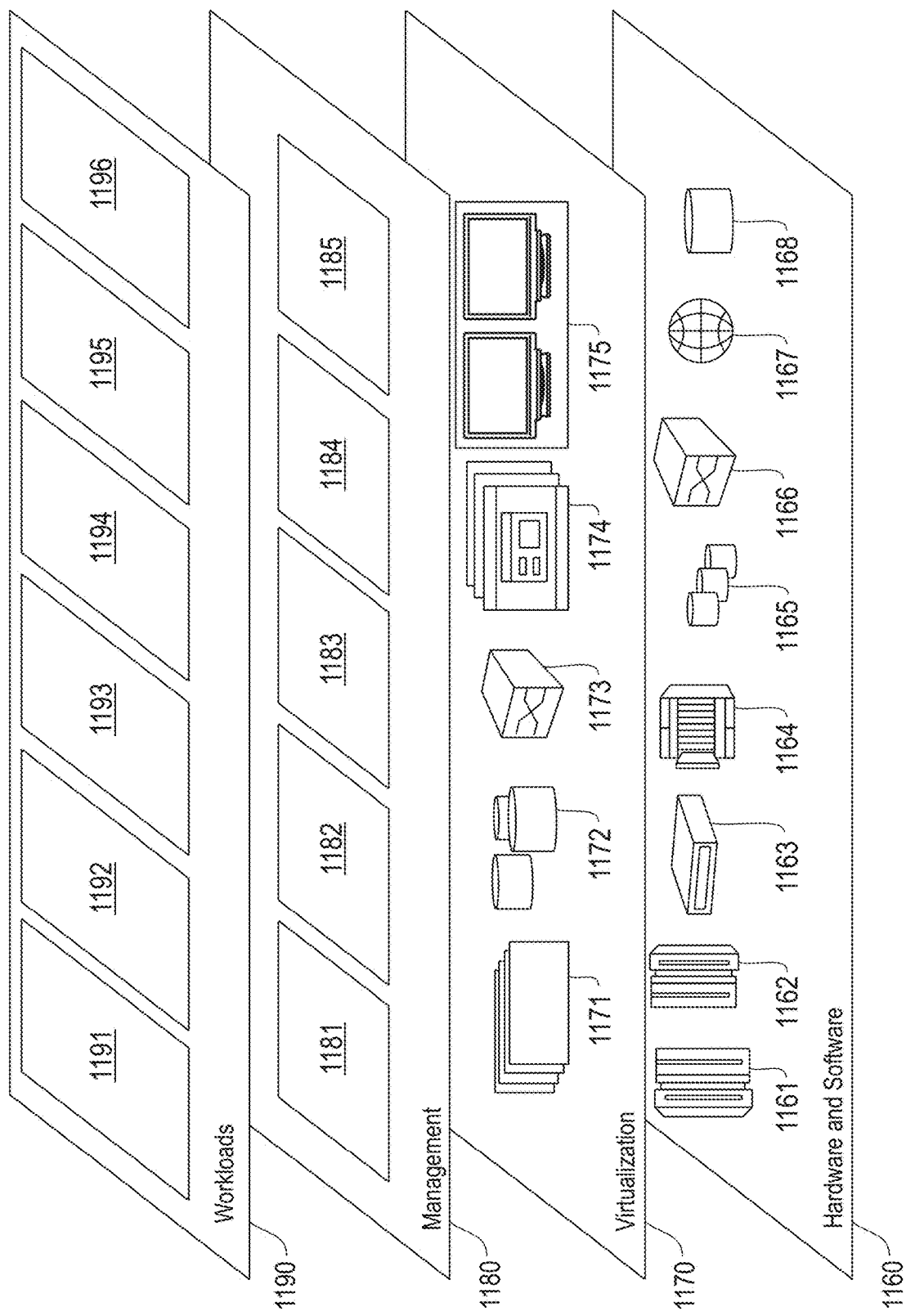
FIG. 11 depicts abstraction model layers, according to an exemplary embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and context embedded processing 1196, which may perform various functions described above with respect to the natural language context embedding techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
extracting, from a given structured document, a document anatomy and a plurality of document elements;
identifying a set of semantic references in the given structured document, utilizing the document anatomy and the plurality of document elements, wherein said identifying the set of semantic references of the given structured document comprises:
  determining, for each of the plurality of document elements, a document element type from among types consisting of a text type, an image type, a table type, and a list type;
  identifying, based at least in part on the determined document element types, structural evidence in the given structured document;
  identifying, based at least in part on the determined document element types, one or more semantic clues in the given structured document; and
  determining the set of semantic references in the given structured document by processing (i) the determined document element types, (ii) the identified structural evidence, and (iii) the one or more identified semantic clues, wherein the set of semantic references comprise a structural evidence-based hierarchy ontology;
determining, utilizing the structural evidence-based hierarchy ontology, (i) a hierarchy of concepts and (ii) relations connecting the concepts, each concept comprising one or more attributes for one of the plurality of document elements;
generating natural language text context for a given one of the document elements by utilizing the structural evidence-based hierarchy ontology to combine (i) at least one attribute of a given one of the concepts corresponding to the given document element with (ii) at least one attribute of at least one other one of the concepts, the at least one other concept corresponding to at least one other one of the plurality of document elements, the at least one other concept being connected to the given concept by at least one of the relations;
modifying the given structured document by embedding the natural language context with the given document element in the given structured document;
utilizing the embedded natural language text context associated with the given document element to generate a summary of at least a portion of the given structured document; and
generating, using the summary, multiple questions and multiple answers to said multiple questions in connection with at least one question and answer exchange in an automated dialog system;
wherein the method is carried out by at least one processing device.

2. The computer-implemented method of claim 1, wherein said extracting the document anatomy comprises utilizing at least one of style information of the given structured document, tags information of the given structured document, and organization information of the given structured document.

3. The computer-implemented method of claim 2, wherein the given structured document comprises a word processing document, and wherein said extracting the document anatomy comprises utilizing the style information to extract relations in the form of header styles from the word processing document.

4. The computer-implemented method of claim 2, wherein the given structured document utilizes a given markup language, and wherein said extracting the document anatomy comprises utilizing the tags information to extract relations in the form of tags of the given markup language from the given structured document.

5. The computer-implemented method of claim 2, wherein the given structured document comprises a format that utilizes one or more hyperlinks for organization information, and wherein said extracting the document anatomy utilizing the organization information comprises extracting relations in the form of the one or more hyperlinks.

6. The computer-implemented method of claim 1, wherein said extracting the plurality of document elements comprises parsing the given structured document to identify a set of structural elements.

7. The computer-implemented method of claim 6, wherein the set of structural elements comprise two or more of paragraph text, tables, figures, numbered lists, bulleted lists, footnotes, and references.

8. The computer-implemented method of claim 1, wherein said identifying the structural evidence comprises:
selecting a first line of the given document element when the given document element comprises one of a paragraph text document element type, a footnote document element type, and a reference document element type;
selecting at least one of a header and a caption of the given document element when the given document element comprises one of a table document element type and a figure document element type; and
selecting a line preceding the first line of the given document element when the given document element type comprises one of a numbered list document element type and a bulleted list document element type.

9. The computer-implemented method of claim 1, wherein said identifying the semantic clues comprises, for a given sentence in the given document element, using natural language processing to identify a type of the given sentence.

10. The computer-implemented method of claim 1, wherein said determining relations connecting the concepts comprises connecting the given document element with one or more other ones of the plurality of document elements utilizing the document anatomy.

11. The computer-implemented method of claim 10, wherein said connecting the given document element with one or more other ones of the plurality of document elements is based at least in part on one or more referential sentences in the given document element.

12. A computer program product, the computer program product comprising a computer readable storage medium having program instructions embodied therewith, the program instructions executable by at least one computing device to cause the at least one computing device to perform steps of:
extracting, from a given structured document, a document anatomy and a plurality of document elements;
identifying a set of semantic references in the given structured document, utilizing the document anatomy and the plurality of document elements, wherein said identifying the set of semantic references of the given structured document comprises:
  determining, for each of the plurality of document elements, a document element type from among types consisting of a text type, an image type, a table type, and a list type;

identifying, based at least in part on the determined document element types, structural evidence in the given structured document;

identifying, based at least in part on the determined document element types, one or more semantic clues in the given structured document; and determining the set of semantic references in the given structured document by processing (i) the determined document element types, (ii) the identified structural evidence, and (iii) the one or more identified semantic clues, wherein the set of semantic references comprise a structural evidence-based hierarchy ontology;

determining, utilizing the structural evidence-based hierarchy ontology, (i) a hierarchy of concepts and (ii) relations connecting the concepts, each concept comprising one or more attributes for one of the plurality of document elements;

generating natural language text context for a given one of the document elements by utilizing the structural evidence-based hierarchy ontology to combine (i) at least one attribute of a given one of the concepts corresponding to the given document element with (ii) at least one attribute of at least one other one of the concepts, the at least one other concept corresponding to at least one other one of the plurality of document elements, the at least one other concept being connected to the given concept by at least one of the relations;

modifying the given structured document by embedding the natural language context with the given document element in the given structured document;

utilizing the embedded natural language text context associated with the given document element to generate a summary of at least a portion of the given structured document; and generating, using the summary, multiple questions and multiple answers to said multiple questions in connection with at least one question and answer exchange in an automated dialog system.

13. A system comprising:

a memory; and at least one processor coupled to the memory and configured for:

extracting, from a given structured document, a document anatomy and a plurality of document elements;

identifying a set of semantic references in the given structured document, utilizing the document anatomy and the plurality of document elements, wherein said identifying the set of semantic references of the given structured document comprises:

determining, for each of the plurality of document elements, a document element type from among types consisting of a text type, an image type, a table type, and a list type;

identifying, based at least in part on the determined document element types, structural evidence in the given structured document;

identifying, based at least in part on the determined document element types, one or more semantic clues in the given structured document; and determining the set of semantic references in the given structured document by processing (i) the determined document element types, (ii) the identified structural evidence, and (iii) the one or more identified semantic clues, wherein the set of semantic references comprise a structural evidence-based hierarchy ontology;

determining, utilizing the structural evidence-based hierarchy ontology, (i) a hierarchy of concepts and (ii) relations connecting the concepts, each concept comprising one or more attributes for one of the plurality of document elements;

generating natural language text context for a given one of the document elements by utilizing the structural evidence-based hierarchy ontology to combine (i) at least one attribute of a given one of the concepts corresponding to the given document element with (ii) at least one attribute of at least one other one of the concepts, the at least one other concept corresponding to at least one other one of the plurality of document elements, the at least one other concept being connected to the given concept by at least one of the relations;

modifying the given structured document by embedding the natural language context with the given document element in the given structured document;

utilizing the embedded natural language text context associated with the given document element to generate a summary of at least a portion of the given structured document; and generating, using the summary, multiple questions and multiple answers to said multiple questions in connection with at least one question and answer exchange in an automated dialog system.

* * * * *